united States Patent Office 2,748,153
Patented May 29, 1956

2,748,153

PREPARATION OF ACYL PHOSPHORIC ESTERS

Arthur C. Cope, Belmont, Mass., and Harold L. Jackson, Wilmington, Del., assignors to E. I. du Pont de Nemours & Company, Wilmington, Del., a corporation of Delaware No Drawing. Application May 5, 1951, Serial No. 224,832

8 Claims. (Cl. 260—461)

This invention relates to a new process for the preparation of diesters of acyl phosphoric acids and more specifically to the mixed anhydrides of phosphate diesters and carboxylic acids.

The mixed anhydrides of monobasic carboxylic acids and mono- and diacid phosphate esters and their use as acylating agents, particularly in exploratory work on amino acids and studies of peptide configuration, have been known for some time. However, even in such primarily laboratory studies where cost is not the controlling factor, the difficulties of the synthetic methods used and the high cost of the intermediates involved have prevented wider scale use of these mixed anhydrides. Recently, it has been disclosed, in the copending application of Kirby Ser. No. 224,850, now Pat. No. 2,625,536, filed herewith, that the mixed anhydrides of dicarboxylic acids and phosphate diesters, i. e., acylbis(orthophosphate diesters) are highly effective in the formation of polyamides by reaction with diamines at low temperatures. To establish these mixed anhydrides on a sound footing in such a relatively large scale outlet as film- and fiber-forming polyamides, a low cost synthesis is needed.

This invention has as an object the preparation of acyl phosphate diesters. Another object is a process for the preparation of acylbis(orthophosphate diesters). A further object is a process for the preparation of nylon intermediates. Other objects will appear hereinafter.

These objects are accomplished by the invention of a process wherein acyl phosphate diesters are prepared in high yields by the reaction at temperatures below 40° C. of a carboxylic acid halide, a basic tertiary amine having only single bonds attached to amino nitrogen, and an orthophosphate diester wherein the carbons directly bonded to ester oxygen are aliphatic in nature, i. e., non-aromatic—all reactants being free of reactive, i. e., Zerewitinoff active, hydrogens except for the single acidic hydrogen of the orthophosphate diester. The reactants are used in essentially equivalent reactive proportions on a molar basis. For reasons of readier availability and lower cost, it is preferred to use those reactants, which other than, respectively, the carboxylic acid halide, the tertiary amino nitrogen, and the monohydrogen orthophosphate diester group, are solely hydrocarbon.

The reaction is normally carried out under anhydrous conditions in an inert organic liquid which is a solvent for and non-reactive with the reactants and the products but is a non-solvent for the tertiary amine hydrohalide formed, e. g., anhydrous diethyl ether. For every acyl phosphate group in the desired product on a molar basis there will be formed during the synthesis reaction a mole of tertiary amine hydrohalide—the halogen of the hydrohalide being that of the acyl halide used. The by-product tertiary amine hydrohalide is removed from the reaction mixture by filtration, the reaction solvent removed by distillation under reduced pressure, and the desired acyl phosphate diester obtained as a residue. The by-product tertiary amine hydrohalide is readily and easily regenerated into the starting basic tertiary amine for further use in this process. The desired acyl phosphate diesters are normally obtained in yields ranging from 85% of theory to essentially quantitative.

The acyl phosphate diesters vary from liquids to solids as a function of molecular weight, i. e., as a function of the number of carbon atoms in the carbon skeletons of the carboxylic acid radical and the two ester radicals. For instance, adipyl-bis(dibenzyl phosphate) is solid; whereas, acetyl dibenzyl phosphate and adipyl-bis(dibutyl phosphate) are liquids.

The following examples in which parts are by weight are illustrative of the invention.

EXAMPLE I

*Preparation of acetyl dibenzyl phosphate*

To a cooled solution (about 3° C.) of 10 parts (one molar proportion) of dibenzyl hydrogen phosphate and 2.8 parts (one molar proportion) of acetyl chloride in about 55 parts of anhydrous diethyl ether is added a solution of four parts (one molar proportion) of freshly distilled triethylamine in about 15 parts of anhydrous diethyl ether dropwise with stirring under anhydrous conditions over a period of about 0.5 hour while maintaining the reaction temperature in the range 5–10° C. A heavy, white precipitate of triethylamine hydrochloride forms during the addition. The reaction mixture is then stirred at room temperature for four hours, the triethylamine hydrochloride removed by filtration, and the solid washed three times with cold anhydrous diethyl ether. The ethereal filtrate is combined with the ether washings and the ether removed therefrom by distillation under reduced pressure without application of heat. There is thus obtained 9.5 parts (85% yield) of acetyl dibenzyl phosphate as a light yellow oil.

*Analysis.*—Calculated for $C_{16}H_{17}PO_5$: C, 59.97%; H, 5.35%; P, 9.67%. Found: C, 60.12%; H, 5.93%; P, 9.38%.

A sample of this product exhibits a positive test for acyl phosphate when treated with hydroxylamine and ferric chloride by the method of Lipmann and Tuttle, J. Biol. Chem., 159, 21–28 (1945). This product is further characterized as acetyl dibenzyl phosphate through the formation of acetanilide when treated with aniline in benzene solution.

EXAMPLE II

*Preparation of acetyl dibutyl phosphate*

In the manner described in Example I a solution of 21 parts of triethylamine (one molar proportion) in about 20 parts of anhydrous diethyl ether is added to a cooled solution (3° C.) of 15.7 parts of acetyl chloride (one molar proportion) and 42.0 parts of dibutyl hydrogen phosphate (one molar proportion) in about 210 parts of anhydrous diethyl ether. The reaction mixture is stirred at ice-bath temperatures for two hours and then at room temperature for two hours. As previously described the triethylamine hydrochloride is then removed by filtration, the solid washed with cold anhydrous diethyl ether, the ethereal filtrate and ether washings combined, and the ether removed therefrom by distillation under reduced pressure without application of heat. There is thus obtained 48.0 parts (95% of theory) of acetyl dibutyl phosphate as a clear, colorless liquid.

*Analysis.*—Calculated for $C_{10}H_{21}PO_5$: C, 47.60%; H, 8.38%; P, 12.27%. Found: C, 47.31%; H, 8.64; P, 12.21%.

A sample of this product gives a negative test for chloride ion when treated with alcoholic silver nitrate solution and a positive test for acyl phosphate in the manner of Lipmann, et al., supra.

EXAMPLE III

*Preparation of caproyl dibutyl phosphate*

A solution of 31 parts of triethylamine (one molar proportion) in about 35 parts of anhydrous diethyl ether is added in the manner described in Example I to a cooled solution (3° C.) of 40.40 parts (one molar proportion) of freshly distilled caproyl chloride and 84.1 parts of dibutyl hydrogen phosphate (one molar proportion) in about 150 parts of anhydrous diethyl ether. The reaction mixture is stirred at ice-bath temperatures for 1½ hours and then at room temperature for two hours. As previously described triethylamine hydrochloride is then removed by filtration, the solid washed with cold anhydrous diethyl ether, the ethereal filtrate and ether washings combined, and the ether removed therefrom by distillation under reduced pressure without application of heat. There is thus obtained 87.0 parts (94% of theory) of caproyl dibutyl phosphate as a clear, slightly amber liquid exhibiting a negative test for chloride ion with alcoholic silver nitrate solution and a positive test for acyl phosphate in the manner of Lipmann, et al., given previously in Example I.

EXAMPLE IV

*Preparation of adipyl-bis(dibutyl phosphate)*

To a cooled (3° C.) solution of 211 parts (2 molar proportions) of dibutyl hydrogen phosphate and 92 parts (one molar proportion) of freshly distilled adipyl chloride in about 142 parts of anhydrous diethyl ether is added dropwise with stirring under anhydrous conditions over a period of 0.5 hour a solution of 103 parts (two molar proportions) of triethylamine in about 130 parts of anhydrous diethyl ether. The reaction mixture is then stirred at ice-bath temperature for an additional two hours and then for two hours at room temperature. The white precipitate of triethylamine hydrochloride is removed by filtration, the solid washed with cold anhydrous diethyl ether, the ether washings and the clear filtrate combined, and the diethyl ether solvent removed by distillation under reduced pressure without application of heat. There is thus obtained 260 parts (98% of theory) of adipyl-bis(dibutyl phosphate) as a liquid exhibiting $n_D^{25}$ of 1.4438 and soluble in methanol, acetone, diethyl ether, benzene, dioxane, pyridine, ethyl acetate, and nitromethane but insoluble in water and a petroleum ether of boiling range 60–71° C.

*Analysis.*—Calculated for $C_{22}H_{44}P_2O_{10}$: C, 49.79%; H, 8.36%; P, 11.67%. Found: C, 49.47%; H, 8.47%; P, 11.67%.

The adipyl-bis(dibutyl phosphate) exhibits a positive test for acyl phosphate by the method of Lipmann, et al. (see Example I). A sample of the adipyl-bis(dibutyl phosphate) reacts with aniline in benzene solution at room temperature to give crystalline N,N'-diphenyladipamide as white platelets melting at 241–242° C.

EXAMPLE V

*Preparation of adipyl-bis(dibenzyl phosphate)*

To a cooled (ice/water bath) solution of 9.15 parts (one molar proportion) of adipyl chloride, 27.84 parts (two molar proportions) of dibenzyl hydrogen phosphate in 420 parts of anhydrous diethyl ether is added dropwise with rapid stirring under anhydrous conditions a solution of 11.0 parts (two molar proportions) of triethylamine in about 20 parts of anhydrous diethyl ether at such a rate that the temperature of the reaction mixture does not exceed 10° C. A heavy, white precipitate of triethylamine hydrochloride forms, and after the addition of the amine solution is complete, the reaction mixture is stirred at ice-bath temperature for four hours and at room temperature for an additional two hours. The triethylamine hydrochloride is removed by filtration through a layer of amorphous diatomaceous silica and the solid washed with a small quantity of cold anhydrous diethyl ether. The ether solvent is removed from the combined ether washings and clear filtrate by distillation under reduced pressure without the application of heat. The clear liquid residue is allowed to stand overnight at about 4° C., during which time it solidifies. The solid adipyl-bis(dibenzyl phosphate) thus obtained exhibits a negative test for chlorine with alcoholic silver nitrate solution and a positive test for acyl phosphate by the method of Lipmann et al. (see Example I). The product is further characterized as adipyl-bis(dibenzyl phosphate) through the formation of polyhexamethyleneadipamide when treated with an aqueous buffered solution of hexamethylenediamine.

EXAMPLE VI

*Preparation of diglycolyl-bis(dibutyl phosphate)*

To a cooled (ice/water bath) solution of 38 parts (one molar proportion) of diglycolyl chloride and 94 parts (two molar proportions) of dibutyl hydrogen phosphate in about 140 parts of anhydrous diethyl ether is added dropwise with rapid stirring under anhydrous conditions, a cooled (ice/water bath) solution of 46.4 parts (two molar proportions) of triethylamine in about 40 parts of anhydrous diethyl ether at such a rate that the temperature of the reaction mixture is maintained below 15° C. A heavy, white precipitate of triethylamine hydrochloride forms. After the triethylamine is added, the reaction mixture is stirred for one hour at 10–15° C. and 2.5 hours more at room temperature. The triethylamine hydrochloride is removed by filtration through a layer of amorphous diatomaceous silica and the white solid washed with cooled anhydrous diethyl ether. The ether solvent is removed from the combined ether washings and clear filtrate by distillation under reduced pressure without the application of heat. There is thus obtained as a residue 108 parts (93% of theory) of diglycolyl-bis(dibutyl phosphate) as a clear, viscous liquid.

*Analysis.*—Calculated for $C_{20}H_{40}P_2O_{11}$: P, 11.96%. Found: P, 11.56%.

The diglycolyl-bis(dibutyl phosphate) product exhibits a negative test for chlorine with alcoholic silver nitrate solution and a positive test for acyl phosphate in the manner of Lipmann et al. (see Example I). The product is further characterized as diglycolyl-bis(dibutyl phosphate) by the formation of polyhexamethylenediglycolamide when treated with an aqueous buffered solution of hexamethylenediamine and also by the formation of N,N'-diphenyldiglycolamide when treated with a chloroform solution of aniline. This dianilide is a white crystalline material melting at 155.0–155.5° C. The reported melting point is 152° C. (Huntress and Mulliken, Identification of Pure Organic Compounds, Order I, p. 110 (1:0495), citing Anschütz, Biernaux, Ann. 273, 67 (1893)).

*Analysis.*—Calculated for $C_{16}H_{16}N_2O_3$: N, 9.86. Found: N, 9.81%, 9.86%.

EXAMPLE VII

*Preparation of terephthalyl-bis(dibutyl phosphate)*

To a cooled (3° C.) solution of 14.45 parts (one molar proportion) of freshly distilled terephthalyl chloride and 30.0 parts (two molar proportions) of dibutyl hydrogen phosphate in about 210 parts of anhydrous diethyl ether is added dropwise with stirring, a solution of 15.0 parts (two molar proportions) of triethylamine in about 15 parts of anhydrous diethyl ether at such a rate that the temperature of the reaction mixture does not exceed 5° C. The reaction mixture is maintained below 5° C. with stirring for an additional three hours and then for one hour at room temperature. The white precipitate of triethylamine hydrochloride is removed by suction filtration through a layer of amorphous diatomaceous silica and the solid washed with a small quanity of cold anhydrous diethyl ether. The ether washings and the clear filtrate are combined and the diethyl ether solvent removed by distillation at room temperature under reduced pressure. The residue is maintained for three hours under a pressure corresponding to 0.2 mm. of mercury at room temperature to remove any residual traces of triethylamine or the ether solvent. There is thus obtained 35.0 parts (89.2% of theory) of terephthalyl-bis(dibutyl phosphate) as a viscous liquid exhibiting a negative test for chlorine with alcoholic silver nitrate and a positive test for acyl phosphate by the method of Lipmann et al. (see Example I).

EXAMPLE VIII

*Preparation of adipyl-bis(dibutyl phosphate)*

To a cooled (3° C.) solution of 21.1 parts (two molar proportions) of dibutyl hydrogen phosphate and 9.2 parts (one molar proportion) of freshly distilled adipyl chloride in about 110 parts of anhydrous diethyl ether is added dropwise with stirring under anhydrous conditions over a period of about half an hour a solution of 15.1 parts (two molar proportions) of N,N'-diethylaniline in about 35 parts of anhydrous diethyl ether at such a rate that the temperature of the reaction mixture does not exceed 5° C. During the addition a white precipitate slowly forms. The reaction mixture is then stirred at ice-bath temperature for an additional two hours and then for 1.5 hours at room temperature. The white precipitate of N,N'-diethylaniline hydrochloride is removed by filtration, the solid washed with cold anhydrous diethyl ether, the ether washings and the clear filtrate combined, and the diethyl ether solvent removed by distillation under reduced pressure without application of heat. There is thus obtained 26.0 parts (98% of theory) of adipyl-bis(dibutyl phosphate) as an amber-colored liquid exhibiting a negative test for ionizable halogen with alcoholic silver nitrate solution and a positive test for acyl phosphate by the method of Lipmann et al. (see Example I).

*Analysis.*—Calculated for $C_{22}H_{44}P_2O_{10}$: P, 11.67%. Found: P, 11.35%.

EXAMPLE IX

To a cooled (3° C.) solution of 211 parts (two molar proportions) of dibutyl hydrogen phosphate and 92 parts (one molar proportion) of freshly distilled adipyl chloride in about 350 parts of anhydrous diethyl ether is added dropwise with stirring under anhydrous conditions over a period of about half an hour 61.0 parts (two molar proportions) of cooled trimethylamine (at about 0° C.) During the addition a white precipitate forms with extreme rapidity. The reaction mixture is then stirred at ice-bath temperature for an additional two hours and then for two hours at room temperature. The white precipitate of trimethylamine hydrochloride is removed by filtration through a layer of amorphous diatomaceous silica, the solid washed with cold anhydrous diethyl ether, the ether washings and the clear filtrate combined, and the diethyl ether solvent removed by distillation under reduced pressure without application of heat. There is thus obtained 264.0 parts (99.6% of theory) of adipyl-bis(dibutyl phosphate) as a clear, slightly colored liquid exhibiting a negative test for ionizable halogen with alcoholic silver nitrate solution and a positive test for acyl phosphate by the method of Lipman et al. (see Example I).

*Analysis.*—Calculated for $C_{22}H_{44}P_2O_{10}$: P, 11.67%. Found: P, 11.35%.

EXAMPLE X

To a cooled (3° C.) solution of 21.1 parts (two molar proportions) of dibutyl hydrogen phosphate and 9.2 parts (one molar proportion) of freshly distilled adipyl chloride in about 110 parts of anhydrous diethyl ether is added dropwise with stirring under anhydrous conditions over a period of about half an hour a solution of 12.0 parts (two molar proportions) of N-ethylpiperidine in about 15 parts of anhydrous diethyl ether at such a rate that the temperature of the reaction mixture does not exceed 10° C. During the addition a white precipitate forms rather rapidly. The reaction mixture is then stirred at ice-bath temperature for an additional one hour and then for four hours at room temperature. The white precipitate of N-ethylpiperidine hydrochloride is removed by filtration, the solid washed with cold anhydrous diethyl ether, the ether washings and the clear filtrate combined, and the diethyl ether solvent removed by distillation under reduced pressure without application of heat. There is thus obtained 25.5 parts (96% of theory) of adipyl-bis(dibutyl phosphate) as a clear, very light colored liquid exhibiting a negative test for ionizable halogen with alcoholic silver nitrate solution and a positive test for acyl phosphate by the method of Lipmann et al. (see Example I).

*Analysis.*—Calculated for $C_{22}H_{44}P_2O_{10}$: P, 11.67%. Found: P, 11.14%, 11.14%.

EXAMPLE XI

*Preparation of caproyl dibutyl phosphate*

As previously described in Example I a solution of 12.0 parts of N-methylmorpholine (one molar proportion) in about 18 parts of anhydrous diethyl ether is added slowly, with stirring, at such a rate that the temperature of the reaction mixture remains below 10° C., to a cooled solution (3° C.) of 13.4 parts (one molar proportion) of freshly distilled caproyl chloride and 21.0 parts (one molar proportion) of dibutyl hydrogen phosphate in about 140 parts of anhydrous diethyl ether. The reaction mixture is stirred at ice-bath temperature for one hour and then at room temperature for three hours. The white precipitate, N-methylmorpholine hydrochloride, which formed during the addition is then removed by filtration, the solid washed with cold anhydrous diethyl ether, the ethereal filtrate and ether washings combined, and the ether removed therefrom by distillation under reduced pressure without application of heat. There is thus obtained 30.0 parts (97.5% of theory) of caproyl dibutyl phosphate as a clear light yellow liquid exhibiting a negative test for chloride ion with alcoholic silver nitrate solution and a positive test for acyl phosphate in the manner of Lipmann et al., given previously in Example I.

*Analysis.*—Calculated for $C_{14}H_{29}PO_5$: P, 10.06%. Found: P, 9.63%, 9.64%.

This product is further characterized as caproyl dibutyl phosphate by its reaction with aniline in benzene solution to form N-phenylcaproamide, melting at 93–94° C.—reported M. P. 94–95° C. by Underwood et al., J. Am. Chem. Soc. 56, 2119 (1934).

*Analysis.*—Calculated for $C_{12}H_{17}NO$: N, 7.33%. Found: N, 7.44%, 7.37%.

The process of this invention is of generic application to the synthesis of acyl orthophosphate diesters, i. e., the diesters of acyl orthophosphoric acids, wherein the two acidic hydrogens in each monoacyl phosphoric acid group are replaced by organic radicals wherein the carbons directly bonded to the ester oxygens are aliphatic in nature, i. e., non-aromatic, said acyl orthophosphate diesters being free of reactive, i. e., Zerewitinoff active, hydrogens. Because of the readier availability of the necessary intermediates and the greater reaction efficiency, the process of this invention is preferably applied to the preparation of the mixed anhydrides of carboxylic acids and orthophosphate diesters which, other than the anhydridized carboxyl radical and the phosphorus, oxygens, and single acidic hydrogen of each orthophosphate diester radical, are hydrocarbon free of aliphatic unsaturation and reactive, i. e., Zerewitinoff active, hydrogen. The process is of equal applicability to the preparation of such mixed anhydrides of mono- and poly-basic carboxylic acids; that is, the process may be applied with equal success to the preparation of monoacyl phosphate esters, acyl-bisphosphate esters, or acyl phosphate esters of still higher polycarboxylic acids.

As pointed out previously, the process is normally carried out using essentially equivalent proportions of the three reactants used, i. e., there will be required, per mole of the carboxylic acid halides, as many moles of the basic tertiary amine and also as many moles of the orthophosphoric acid diester as there are acid halide (haloformyl) groups in the carboxylic acid halide. Thus, in the preparation of an acyl-bis(dihydrocarbon phosphate), two moles of both the necessary phosphate diester and the basic tertiary amine are required for each mole of the dicarboxylic acid halide. For example, in the preparation of adipyl-bis(dibenzyl phosphate), one mole of adipyl chloride will be reacted with two moles of dibenzyl phosphate and two moles of the basic tertiary amine, e. g., triethylamine, being used.

In the process of this invention for every acyl halide group condensed with the acidic hydrogen of each orthophosphate diester there is formed one mole of the hydrohalide of the basic tertiary monoamine or amines being used—the halogen of the hydrohalide being the halogen of the acyl halide. To facilitate the isolation of the desired product and to make the condensation more efficient, it is preferred to carry out the reaction in an organic medium normally liquid at room temperature which is a solvent for and non-reactive with the acyl halide, basic tertiary amine, and phosphate diester reactants as well as the acyl phosphate diester products, but is a non-solvent for the tertiary amine hydrohalide, which precipitates from the reaction mixture as formed and can conveniently be removed by filtration. This by-product tertiary amine hydrohalide can readily and easily be regenerated to the basic tertiary amine by standard procedures, for instance, most conveniently by treatment with strong aqueous alkali, and further used in the process.

The desired acyl phosphate diester products are obtained in relatively high stages of purity and excellent yield by merely removing the reaction solvent from the filtrate obtained from the above indicated filtration stage. The reaction solvent is most conveniently removed by distillation under reduced pressure, preferably at as low a temperature as is consistent with normal operating equipment. It is most convenient and least expensive to carry out this distillation under such a reduced pressure that the reaction solvent can be distilled at room temperature. Temperatures above about 70° C. should not be used since the decomposition of the acyl phosphate diesters becomes noticeable in this range. Accordingly, those non-reactive, organic liquids whose normal boiling point is less than 150° C., and preferably less than 100° C., are normally used as reaction media.

Since the acyl phosphate diester products are noticeably sensitive to even relatively low temperatures of the order of 70° C. and particularly to temperatures above 100° C., it is usually not advisable to carry out the process of this invention at elevated temperature. In fact, although the process can be carried out at temperatures as high as about 70° C., it is usually preferred to operate in the range 0 to 10° C. The reaction is of relatively high efficiency even in these low operating ranges, and at the same time there is essentially no thermal decomposition of the acyl phosphate diester products.

In the process of this invention there may be employed, for the preparation of the acyl phosphate diesters, any monoacid phosphate diester, which, apart from the single acid hydrogen in each phosphate ester group, is free of reactive, i. e., Zerewitinoff active, hydrogens, and has two organic radicals, alike or different, and usually of no more than 18 carbons each, bonded through carbon aliphatic in character, i. e., non-aromatic, and usually a carbinol, i. e., alcoholic, carbon to the two ester oxygens, which in turn are separately and singly bonded to phosphate phosphorus. Particular examples of the orthophosphate diesters which can be used in the process of this invention include: aliphatic orthophosphate diesters, e. g. dimethyl, methyl ethyl, diethyl, dipropyl, diallyl, di-n-butyl, diisoamyl, di-n-octyl, di-n-hexadecyl, di-n-octadecyl orthophosphates; cycloaliphatic orthophosphate diesters, e. g. dicyclohexyl orthophosphate; aliphatic/cycloaliphatic orthophosphate diesters, e. g. cyclohexyl ethyl orthophosphate; araliphatic orthophosphate diesters, e. g. dibenzyl orthophosphate; aliphatic/araliphatic orthophosphate diesters, e. g. ethyl benzyl, isoamyl benzyl, n-hexyl benzyl orthophosphates; substituted aliphatic orthophosphate diesters, e. g. ethyl beta-chloroethyl, allyl beta-chloroethyl, di(beta-fluoroethyl), di(1,3-dichloro-2-propyl), di(3,3,3-trichloro-2-propyl), beta-chloroethyl n-hexadecyl, di(1,3-diphenoxy-2-propyl), di(1,3-di(p-methylphenoxy)-2-propyl)orthophosphates; substituted araliphatic orthophosphate diesters, e. g. di(4-bromobenzyl) orthophosphate, and the like.

The invention finds its greatest field of utility in the reaction of acyl halides of mono-, di- or higher fatty carboxylic acids with orthophosphoric acid esters of monohydric alcohols in which alcohols the alcoholic hydrogen is the only active hydrogen and in which esters there is but one active hydrogen and that the hydrogen of the one unesterified phosphoric acid hydroxyl. However, it is applicable in general to the reaction of the acid halides with esters of orthophosphoric acid in which esters one hydroxyl group of the orthophosphoric acid remains unesterified, two hydroxyl groups being esterified with alcoholic hydroxyl preferably of a monohydric alcohol but optionally of a polyhydric alcohol, e. g. a glycol having a two to three carbon chain between the two hydroxyls. Because of their readier availability and great reaction efficiency, it is preferred to use the orthophosphate diesters which have the single acidic hydrogen as their only active (Zerewitinoff) hydrogen and contain only the one phosphorus, the three oxygens, hydrogen and carbon free of aliphatic unsaturation.

In the process of this invention there may be used the acid halide of any carboxylic acid, mono-, di-, or poly- which has carboxyl hydrogen as its only active (Zerewitinoff) hydrogen. The halogen of the acyl halides may be any one of the four halogens, that is, acyl fluorides, e. g. formyl or acetyl fluoride, bromides, e. g. benzoyl or butyryl bromide, or iodides, e. g. propionyl or phenacetyl iodide can be used in the process of this invention as well as the acyl chlorides. Because of their readier availability and lower cost, the acyl chlorides are normally used. Carboxylic acid chlorides useful in the process of this invention include saturated aliphatic monocarboxylic acid chlorides, e. g. formyl, acetyl, propionyl, butyryl, valeryl, caproyl, capryl, hendecanoyl, lauroyl, myristoyl, palmityl, stearoyl chlorides; unsaturated aliphatic monocarboxylic acid chlorides, e. g. acrylyl, methacrylyl, crotonyl, 3-butenoyl, hydrosorbyl, sorbyl, propiolyl, 3-butynoyl chlorides; substituted saturated and unsaturated aliphatic monocarboxylic acid chlorides, e. g. dichloroacetyl, trifluoroacetyl chlorides; aromatic monocarboxylic acid chlorides, e. g. benzoyl, 2-naphthoyl, 1-anthroyl chlorides; substituted and unsubstituted aromatic/aliphatic monocarboxylic acid chlorides, e. g. phenylacetyl chloride; substituted and unsubstituted cycloaliphatic monocarboxylic acid chlorides, e. g. 2-norcamphanecarbonyl, cyclobutanecarbonyl, cyclopentanecarbonyl, cyclohexanecarbonyl, cycloheptanecarbonyl chlorides; substituted and unsubstituted cycloaliphatic/aliphatic monocarboxylic acid chlorides, e. g. cyclohexaneacetyl, cyclopentanetridecanoyl, alpha-ethylcyclohexaneacetyl chlorides; substituted and unsubstituted heterocyclic monocarboxylic acid chlorides, e. g. nicotinyl, quinaldyl, cinchoninyl, pyrazinoyl, antipyryl chlorides; aliphatic monocarboxylic acid chlorides containing intrachain, i. e., heterocatenic, oxygen, nitrogen, or sulfur heteroatoms, e. g. 4-thiahexanoyl, 4-ethyl-4-azahexanoyl, 4-oxohexanoyl chlorides; saturated, aliphatic dicarboxylic acid chlorides, e. g. oxalyl, malonyl, succinyl, glutaryl, adipyl, pimelyl, suberyl, azelayl, sebacyl, hendecanedioyl, dodecanedioyl, brassylyl, thapsyl, eicosanedioyl, alpha,beta-diethylsuccinyl, alpha-butyl-alpha-ethylglutaryl chlorides; unsaturated aliphatic dicarboxylic acid chlorides, e. g. maleyl, fumaryl, glutaconyl, alpha-hydromuconyl, beta-hydromuconyl, muconyl, 4-amyl-2,5-heptadienedioyl, 3-hexynedioyl, 4,6-decadiynedioyl chlorides; substituted saturated and unsaturated aliphatic acid chlorides, e. g. 4-ketopimelyl chloride; aromatic dicarboxylic acid chlorides, e. g. the phthalic and the diphenic acid chlorides, naphthalyl chloride; substituted and unsubstituted aromatic/aliphatic dicarboxylic acid chlorides, e. g. 3-carboxycinnamyl chloride; substituted and unsubstituted cycloaliphatic dicarboxylic acids, e. g. cis- and trans-1,4-cyclohexanedicarbonyl chlorides; substituted and unsubstituted cycloaliphatic/aliphatic dicarboxylic acids, e. g. 1,2-cyclohexanediacetyl chloride and 2-carboxy-2-methylcyclohexane acetyl chloride; substituted and unsubstituted heterocyclic dicarboxylic acid chlorides, e. g. dinicotinyl, acridinyl, 3,4-quinolinedicarbonyl chlorides; aliphatic dicarboxylic acid chlorides containing intrachain, i. e., heterocatenic, oxygen, nitrogen, or sulfur heteroatoms, e. g. thio-bis-propionyl, oxy-bis-propionyl, ethylimino-bis-propionyl, diglycolyl, thio-bis-butyryl, thio-bis(5-methylhexanoyl) and sulfonyl-bis(5-methylhexanoyl) chlorides. Halides and particularly the chlorides of polycarboxylic acids containing more than two carboxylic acid functions, can be used in the process of this invention, including saturated aliphatic polycarboxylic acid chlorides, e. g. 1,1,5-pentanetricarbonyl, 1,2,4-hexanetricarbonyl, 2-propyl-1,2,4-pentanetricarbonyl, and tricarballylyl chlorides; unsaturated aliphatic polycarboxylic acid chlorides, e. g., 5-octene-3,3,6-tricarbonyl and 3-hexene-2,2,3,4-tetracarbonyl chlorides; aromatic polycarboxylic acid chlorides, e. g. 1,2,3- 1,2,4-, and 1,3,5-benzenetricarbonyl, 1,2,3,4-, 1,2,3,5-, and 1,2,4,5-benzenetetracarbonyl, benzenepentacarbonyl and mellityl chlorides. These acid halides, particularly the acid chlorides, can be prepared by methods well known in the art. For instance in the case of the acyl chlorides, the carboxylic acids can be reacted with typical halogenating agents such as phosphorus trichloride, phosphorus pentachloride, thionyl chloride, sulfuryl chloride or alternatively the metal salt of the carboxylic acid, usually the alkali metal salt, can be reacted with phosphorus oxychloride. The acyl bromides can be synthesized in a similar manner using the carboxylic acids and the corresponding phosphorus bromides. The acyl iodides can be obtained in the same general manner from the carboxylic acid anhydrides or the carboxylic acid salts by reaction with phosphorus iodide or alternatively by the metathetical reaction between the corresponding acyl chlorides and calcium iodide or similar alkaline earth metal iodide. The acyl fluorides are usually obtained by the metathetical reaction between the corresponding acyl chlorides and potassium fluoride, or other alkali metal fluorides.

Any basic tertiary amine capable of forming acid addition salts, particularly with the hydrohalic acids, having only single bonds attached to a tertiary amino nitrogen, and free of reactive, i. e., Zerewitinoff active, hydrogens can be used in the process of this invention in conjunction with the required carboxylic acid halide and monoacid phosphate diester in preparing the desired acyl phosphate diesters. Particular examples of the tertiary amines which can thus be used include the symmetrical, tertiary, aliphatic amines, e. g. trimethyl-, triethyl-, tri-n-propyl-, tri-n-butylamines; the unsymmetrical, tertiary, aliphatic amines, e. g., N-ethyl-, N-methylpropyl-, N,N-dimethylbutyl-, N-dimethylpropyl-, N,N-diethylbutyl-, N,N-diethylpropylamines; cycloaliphatic/aliphatic, tertiary amines, e. g. N,N-diethylcyclohexylamine, N-ethyl-dicyclohexylamine; aromatic/aliphatic, tertiary amines, e. g. N,N-dimethylaniline, N,N-diethylaniline; aliphatic/heterocyclic, tertiary amines, e. g. N-methylpiperidine, N-ethylpiperidine, N-methylpyrrolidine, N-methylpyrroline. Monoamines hydrocarbon except for amine nitrogen are preferred. Diamines, e. g. tetramethylethylenediamine and other polytertiaryamines can be employed. Because of the greater ease in removal of any unreacted tertiary amine from the reaction mixture obtained in the process, it is preferred to use those tertiary amines whose normal boiling point is below 150° C. and most preferably below 100° C.

The process is normally carried out in an unreactive organic liquid of boiling point not more than 150° C. which is a solvent for the reactants and for the products except the amine hydrohalide. Suitable liquids include aromatic hydrocarbons, e. g. benzene, toluene, the xylenes; halogenated hydrocarbons, e. g. carbon tetrachloride, 1,1- and 1,2-dichloroethane, 1,1- and 1,2-dibromoethane, chlorobenzene; hydrocarbon ethers, e. g. diethyl, dipropyl, dibutyl ethers, dioxane, tetrahydrofuran. In the case of certain of the lower hydrogen containing halogenated hydrocarbons, e. g. chloroform, methylene chloride and the like, the acyl phosphate diesters will usually be contaminated with traces of the tertiary amine hydrohalide since these compounds, particularly the lower tertiary amine adducts, e. g. trimethyl- or triethylamine hydrochloride, are soluble to an appreciable extent in these halogenated hydrocarbons. The product can be readily freed of this contaminating material by further extraction with aromatic hydrocarbons or hydrocarbon ethers. However, because of the extra purification step usually needed, these lower halogenated hydrocarbons are not preferred. The preferred reaction media are, therefore, the liquid aromatic hydrocarbons and hydrocarbon ethers.

The acyl phosphate esters prepared by the process of this invention are, of course, useful in many ways. For instance, they may be used as intermediates in the preparation of other useful organic compounds and are effective as biologically active compounds, particularly as aphicides and miticides. The acyl-bis-phosphate esters can be reacted at low temperatures with essentially equivalent reactive proportions of aminohydrogen-containing diamines to form dibasic acid/diamine type linear condensation polyamides as discussed in greater detail in the copending application of Kirby, Ser. No. 224,850 filed herewith.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of acylphosphoric esters wherein a carboxylic acid halide is reacted with essentially equivalent amounts of a basic tertiary amine free from Zerewitinoff active hydrogen and having only single bonds on a tertiary amino nitrogen and of a diester of orthophosphoric acid, the only active hydrogen of said diester being the one phosphoric acid hydrogen and the carbons joined to phosphoric acid oxygen being aliphatic in character.

2. Process of claim 1 conducted in an anhydrous inert solvent for the reaction components and the acylphosphoric acid ester product.

3. Process of claim 2 wherein the solvent is a hydrocarbon ether.

4. Process of claim 1 wherein the carboxylic acid halide is a carboxylic acid chloride.

5. Process of claim 4 wherein the carboxylic acid chloride is a dicarboxylic acid chloride.

6. Process of claim 1 wherein the tertiary amine is a trialkylamine.

7. Process of claim 1 wherein the reaction is carried out under anhydrous conditions.

8. Process of claim 1 wherein the reaction is carried out under anhydrous conditions in an inert organic liquid which is a solvent for the reaction components and the acylphosphoric acid ester product but is a non-solvent for the tertiary amine hydrohalide reaction product.

References Cited in the file of this patent

UNITED STATES PATENTS 2,659,747     Young ---------------- Nov. 17, 1953

OTHER REFERENCES

Brooks: J. Amer. Chem. Soc., v. 34, pg. 493 (1912).
Hurd: J. Am. Chem. Soc., vol. 54, pg. 3427 (1932).
Lyner: Ber. Deut. Chem., vol. 73, pg. 368 (1940).